United States Patent [19]

Gumbert

[11] Patent Number: 5,698,264
[45] Date of Patent: Dec. 16, 1997

[54] METHOD AND COMPOSITION FOR PAINT MASKING

[76] Inventor: Michael A. F. Gumbert, Apt. 314, 2235 Lincoln Ave., Alamedia, Calif. 94501

[21] Appl. No.: 615,886

[22] Filed: Mar. 14, 1996

Related U.S. Application Data

[62] Division of Ser. No. 297,177, Aug. 29, 1994, Pat. No. 5,562,766.

[51] Int. Cl.⁶ .................. B05D 1/32; B05D 1/02; B05D 5/00
[52] U.S. Cl. .................. 427/282; 427/154; 427/272; 427/421
[58] Field of Search .................. 427/154, 272, 427/282, 421

[56] References Cited

U.S. PATENT DOCUMENTS

| | | | |
|---|---|---|---|
| 4,778,832 | 10/1988 | Futami et al. | 523/109 |
| 5,186,978 | 2/1993 | Woodhall et al. | 427/154 |
| 5,308,647 | 5/1994 | Lappi | 427/154 |

FOREIGN PATENT DOCUMENTS

| | | | |
|---|---|---|---|
| 2209817 | 7/1974 | France | C09D 5/00 |
| 1-36754 | 2/1989 | Japan | C23C 4/02 |
| 2130193 | 5/1984 | United Kingdom | C04B 13/24 |

*Primary Examiner*—Shrive Beck
*Assistant Examiner*—Michael Barr
*Attorney, Agent, or Firm*—Edward J. Sites

[57] ABSTRACT

Novel compositions and methods are provided for forming masks used in air brash painting. The masking compositions used in this invention are liquids as applied and are hardenable into a friable paint masking layer. The preferred compositions of this invention are comprised of a hydratable binder, such as plaster of Paris, an inert filler, such as calcium carbonate, and water. The amount of the filler is selected relative to the amount of the binder to substantially weaken and make friable the resulting hardened layer. In the method of this invention the composition is applied to the area of a substrate to be masked. The applied layer if desired is shaped with a tool to provide details in the resulting mask. The layer is then hardened to form a brittle friable masking layer directly adhered to surface of the substrate. The substrate is then airbrush painted. The mask is removed by fracturing the mask and removing the resulting particles.

13 Claims, 1 Drawing Sheet

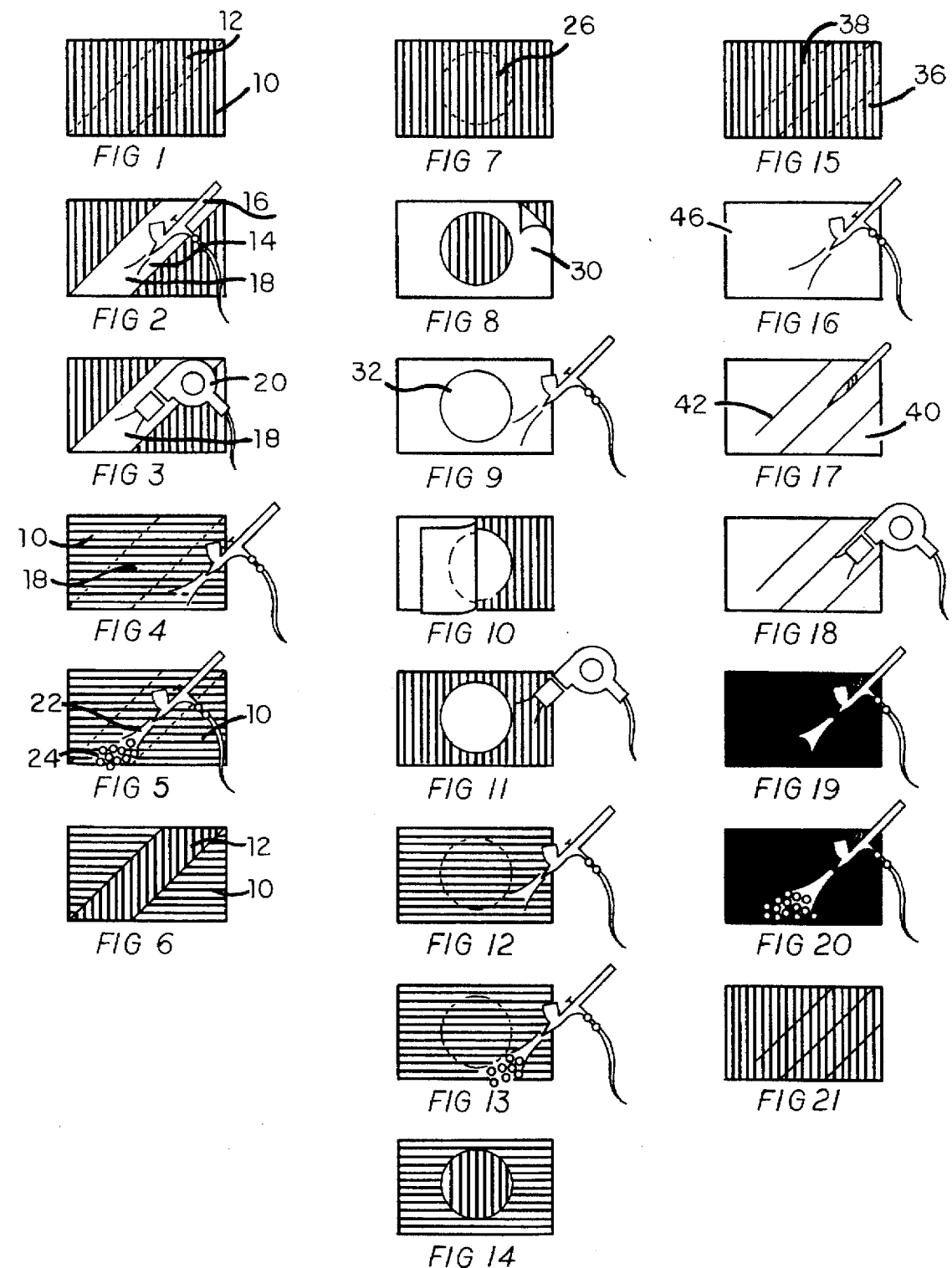

METHOD AND COMPOSITION FOR PAINT MASKING

This application is a division of Ser. No. 08/297,177 filed Aug. 29, 1994 now Patent No. 5,562,766.

BACKGROUND OF THE INVENTION

1. Field of the Invention

This invention relates to a novel method for masking a substrate prior to painting. More particularly, this invention is concerned with a novel method and composition for forming a mask on a substrate which is to be painted with an air brush, which method and composition are easy to use; can be employed to produce high definition masks for air brush painting; and which can easily be removed after use.

2. Description of the Preferred Embodiments

Air brush painting is widely used in applications from touching up photographs to the creation of original works of art. The basic instrument used in air brush painting is an air brush. An air brush is a type of miniature spray gun which atomizes the liquid desired to be painted into droplets, and allows the spray application of the atomized droplets onto a substrate. An air brush can be used to apply most liquid media. Typically, air brushes are used to apply watercolors, gouaches, acrylic paints, oil paints, and inks. The substrates which can be air brush painted include paper, textiles, glass, metal and plastics. Paper is the most commonly used substrate for air brush painting. Textiles are also an important substrate as air brash painting is used extensively to decorate articles of clothing, such as tee shirts.

Air brush painting to a large extent has replaced the use of conventional artist brushes in commercial art and other related fields. There are advantages of an air brash in comparison to an artist brash and disadvantages.

A person using artist brushes has to employ a selection of different size and types of brushes. The artist must select the particular size and type of artist brush best suited for the application of the desired paint to an area to be painted. Often a combination of different brushes are used to paint a given area. The bristles of the artist brash are loaded with paint from a palette or the like. The artist brush is then brought into direct contact with the area to be painted and by controlling the movement and pressure on the brush the paint can be made to flow from the bristles onto the substrate. The painting process with an artist brush has to be interrupted at short intervals and the artist brush reloaded with paint to cover even moderate size areas. There is however no need to mask areas of a substrate when using an artist brush as the paint can be selectively applied to a given area and it is possible to paint small features.

An air brush is more versatile and much faster than an artist brush. An air brush can readily be controlled to limit the mount of paint applied to a given area to allow for shading. In addition an air brush can be used to rapidly spray paint on relatively large areas. A person using an air brush does not need a collection of different types and sizes of air brushes like the person using artist brushes. The coverage of a single air brash can be easily controlled by moving the air brash toward or away from the substrate being painted. An air brash also does not have to be repeatedly reloaded with paint. The paint is initially loaded into a reservoir which typically holds enough paint to continuously supply paint to the air brash until the desired area is completely painted. An air brash is much faster to paint with than with artist brushes because of the use of a single instrument, the wider range of control obtainable with an air brash and the elimination of the requirement of frequently reloading with paint. A further advantage of an air brash is that the paint is applied without brush marks.

Air brushes have a significant disadvantage which has limited to their effectiveness and heretofore required the use of artist brushes for detail work in most air brash paintings. As noted above an air brash atomizes the paint and sprays the paint in the form of droplets. The paint which is deposited as a spray does not have the high resolution obtainable with an artist brash but rather the edge of the sprayed area are "fuzzy" due to the spray pattern. In addition, special care must be taken when using an air brush to prevent the paint from being deposited inadvertently or as an over spray on areas not intended to be painted. The inability to obtain a clear demarcation of painted areas with air brush painting is a distinct limitation. This is particularly troublesome when painting features which require fine details such as bird feathers, animal fur, and detailed patterns such as lace. To obtain free details in air brash painting it has heretofore been necessary to resort to the use of artist brushes, pens and pencils to supplement the air brush.

Masks are used in air brush painting to obtain high definition paintings. The masks are used to obtain sharp edge definition and to protect the masked areas from inadvertent spraying and over spray. The application of a mask however can be very time consuming and tedious work. The masks are shaped to conform to the exact configuration of the area to be masked. It is not unusual for the preparation and application of a mask to take much more time than the actual air brush painting.

The materials used to make the masks include paper, vellum, acetate film and frisket. Paper, vellum and acetate film masks can be cut to the required shape and then mechanically secured to the surface of a substrate with tacks, staples or tape. This method of attachment has the disadvantage that the painted edges of the masked area are softer in definition due to some of the spray going under the edges of the mask. In order to obtain sharp, hard edges it is necessary to secure paper, vellum and acetate film masks tightly to the surface of the substrate with an adhesive such as rubber cement. The application of an adhesive to a mask is a difficult and messy process particularly if the mask has small detailed cutouts. The removal of the adhesive from the substrate after the mask is used is difficult and time consuming.

An additional material used for masking is frisket. Frisket is a ready made masking material available from various commercial sources. Frisket is made of paper or plastic film which has a robber based adhesive preapplied on one surface which is covered with a removable protective film. In use the frisket is cut to size and then the protective film is removed to secure the frisket mask to a substrate.

All of the mask materials, and methods described, above have proven in use to be unsatisfactory. If the mask is not adhered tightly to the substrate, the painted edges of the masked area are poorly defined. On the other hand if the mask is tightly adhered to the surface of the substrate with an adhesive such as rubber cement, the surface of the substrate can easily be damaged when the mask is removed. Individual fibers can be pulled from the surface of paper and textiles which adversely affect the surface finish. The removal of the rubber adhesive from the surface of the substrate is time consuming, typically involving peeling or rubbing the adhesive from substrate.

It has been suggested to use a material, called liquid frisket, to form masks. Liquid frisket is a liquid dispersion of a rubber latex. Liquid frisket is painted on the area to be masked with a brush, and then dried to a continuous film. Liquid frisket has substantial drawbacks which make it particularly unsatisfactory when used on paper and especially unsatisfactory on textile substrates. Liquid frisket, unlike most liquids, cannot be air brushed because liquid frisket clogs air guns. Liquid frisket is too fluid to form details in the coating as applied. After the liquid frisket has dried, the resulting film it is almost impossible to cut details into the mask because of the adhesion of the mask to the substrate. A particular troublesome problem encountered with liquid frisket, is that the mask is very difficult to remove from paper substrates and almost impossible to remove from textile substrates. The liquid frisket as it is applied penetrates and bonds tightly to the individual fibers of paper and textiles. Individual fibers, and even sections of paper are pulled from the surface of paper, when the dried film of liquid frisket is removed from paper by either peeling or robbing. Even more of a problem, is that the dried film of liquid frisket cannot be removed from textiles by peeling or rubbing as the masking fluid when applied soaks deeply into textiles and become intimately bonded to the individual fibers. The only way to completely remove the dried film from textiles is to use a solvent. This is unsatisfactory because of the adverse effects of the solvent on the applied paint and the textile.

An additional masking technique used in air brush painting is to use an open material such as, screening, lace or cheese cloth, as a stencil. The open material is placed on the surface of the substrate and paint sprayed through the open material onto the underlying substrate. The open material is removed to reveal the openings in the material as the painted area, and the pattern of the material as the unpainted area. This technique has serious disadvantages in that the desired pattern of the open material is formed in a negative pattern, that is, an unpainted area on the substrate. In most situations it is desired to form a positive copy of the open material, such as a lace, directly on the substrate. To obtain a painted pattern of the open material it now necessary to use a base coat of the desired color, and then, apply the background color with the open material in place on the substrate. The requirement of using multiple colors to obtain a positive copy increases the time, and complexity involved in making a painting. A further problem of this method is that the open material cannot easily be tightly adhered to the surface of a substrate. As a result the reproduction of the desired pattern is not sharp as the paint spray tends to pass under the open material.

What would be highly desirable would be a masking method and a masking composition which are easy to use, and can be used to make high definition air brush painting. Preferable the masking composition should be applicable with an air brush; once applied should be able to be shaped to form details in the mask; and would provide an effective high definition masking for air brush painting. It would be especially desirable if the method and composition could be used to make positive masks. Last, but not least, the mask after use should be readily removed without damage to the underlying substrate including paper and in particular textile substrates.

BRIEF SUMMARY OF THE INVENTION

In accordance with this invention, a novel method and masking compositions are provided. The masking compositions used in this invention are liquids as applied and are hardenable into a friable, paint masking effective, layer. The preferred compositions of this invention are comprised of a hydratable binder, such as plaster of Paris, an inert filler, such as calcium carbonate, and water. The amount of the filler is selected relative to the amount of the binder to substantially weaken the bond to the substrate and make the resulting hardened layer friable. In the method of this invention the composition is applied to the area of a substrate to be masked. The applied layer, if desired, is shaped with a tool to provide details in the resulting mask. The layer is then hardened to form a brittle friable masking layer directly adhered to the surface of the substrate. The strength of the hardened layer is controlled by the amount of the filler added, so that, the hardened layer will withstand the air pressure employed in air brash painting but can be fractured with a slightly higher pressure air blast. The substrate is painted with an air brush. The mask is then removed by fracturing the mask and removing the resulting particles.

BRIEF DESCRIPTION OF THE DRAWINGS

FIG. 1 is a schematic illustration of the starting substrate with the area to be masked shown with dotted lines.

FIG. 2 is a schematic illustration of a masking composition being sprayed onto the area to be masked.

FIG. 3 is a schematic illustration of the substrate of FIG. 2 being heated to harden the masking composition.

FIG. 4 is a schematic illustration of the substrate of FIG. 3 being air brush painted.

FIG. 5 is a schematic illustration of the substrate of FIG. 4 in which the hardened masking composition is being fractured and removed with an air blast.

FIG. 6 is a schematic illustration of the completed substrate.

FIG. 7 is a schematic illustration of a substrate with the desired pattern shown in dotted line.

FIG. 8 is a schematic illustration of the substrate of FIG. 7 with a stencil in place on the substrate with a corner folded over for purpose of illustration.

FIG. 9 is a schematic illustration of the substrate of FIG. 8 being sprayed with a masking composition.

FIG. 10 is a schematic illustration of the substrate of FIG. 9 with the stencil being removed from the surface of the substrate.

FIG. 11 is a schematic illustration of the substrate of FIG. 10 wherein heat is being applied to harden the masking composition.

FIG. 12 is a schematic illustration of the substrate of FIG. 11 being painted with an air brush.

FIG. 13 is a schematic illustration of the substrate of FIG. 12 having the hardened layer of masking composition being contacted with an air blast to fracture the layer and remove it from the surface of the substrate.

FIG. 14 is a schematic illustration of the completed substrate.

FIG. 15 is a schematic illustration of a starting substrate with the desired line pattern shown in dotted lines.

FIG. 16 is a schematic illustration of the substrate of FIG. 15 covered with the masking composition of this invention.

FIG. 17 is a schematic illustration of the substrate of FIG. 16 shaped with a tool to form the desired line pattern in the layer of masking composition.

FIG. 18 is a schematic illustration of the substrate of FIG. 17 being heated to set the layer of masking composition.

FIG. 19 is a schematic illustration of the substrate of FIG. 18 being air brush painted.

FIG. 20 is a schematic illustration of the substrate of FIG. 19 with the mask being removed with a blast of air.

FIG. 21 is a schematic illustration of the completed substrate.

DETAILED DESCRIPTION OF THE PREFERRED EMBODIMENTS

One of the most important steps in the method of this invention is the selection of the masking composition. The masking compositions used in this invention have certain properties that are different from the properties of the masking materials heretofore employed. The differences in properties accounts for the excellent results obtained with the present invention.

The masking compositions, suitable for use in this invention, are applicable as liquids to the substrates to be masked. The suitable compositions can be applied with a paint brush, roller and preferable with an air brush. This is a considerable advantage over the prior art masking materials supplied in sheet form. The masking composition can be painted on the substrate in the exact shape required for the mask. This is simpler and faster than cutting the sheet masking materials into the required shape. Application with an air brush is a distinct advantage over liquid frisket which must be painted on the substrate.

The preferred compositions used in this invention should, after application, form a semi-solid layer on the substrate which layer can be shaped to form openings in the applied mask. This feature is important if it is desired to have small openings in the mask which correspond to small details in the painting such as individual hairs and the like. The small openings can be formed with a tool, such as a pick, to produce features not heretofore possible to paint with an air brush. The applied semi-solid layer made from the compositions suitable for use in this invention has poor wet film strength. The poor wet film strength allows a stencil, or stencil like material such as open fabric, to be applied to the substrate to be masked; the masking composition applied over the stencil; and then the stencil removed. The poor wet film strength of the layer of masking composition allows the semi-solid layer to separate precisely and form well-defined openings in the layer positively corresponding to the stencil. In comparison liquid frisket cannot be used in this manner as it is too fluid as applied and penetrate too deeply into porous substrates such as paper and textiles to be removed in the above manner.

A further and very important property of the masking compositions suitable for use in this invention is that they are hardenable into a paint masking effective layer directly adhered to the surface of the substrate. This allows hard edges to be painted at the borders of the mask.

The hardened mask prepared from compositions suitable for use in this invention are weakly adhered to the substrate so that the bond with the substrate can easily be broken, and the hardened mask removed after use.

The method used to harden the masking composition is dependent on the particular composition employed. Certain resinous compositions that can be used in this invention are hardened with a catalyst which allows a limited mount of open time to allow shaping of the applied mask before hardening. Other compositions used in this invention are hardened by drying to remove a solvent such as water. Still others are hardened by a chemical reaction between the components of the composition that can be accelerated by the application of heat.

The term "paint masking effective" as used in this specification is used to define a layer of the hardened masking composition of sufficient thickness to prevent the applied paint from contacting the masked areas of the substrate. The paint masking properties of a masking composition are determined by the inherent masking properties of the material and the thickness of the layer applied. The particular parameters required for a given masking material are readily determined by person familiar with air brush painting and masking.

The masking compositions suitable for use in this invention are characterized by their low adhesion to substrates and in particular paper and textiles. The masking composition after being hardened must adhere sufficiently tightly to a substrate so that the substrate can be painted with an air brush and form hard edges. However, unlike conventional masking materials, the layer of hardened masking composition is only weakly adhered to the surface of the substrate. The hardened layer of masking material of this invention is sufficiently strong that it can withstand being painted with the air pressures used in the air brash painting, which typically are about 30 to 40 psi. The hardened masking material also is sufficiently friable that it can be broken and removed with an air blast higher in pressure than the pressure used in the air brush painting, for example, about 15 to 20 psi higher than the painting pressure. In practice the fracturing and removal of the hardened masking material can be done with a blast of air, or by manually brushing the hardened mask with a firm brush or, in the case of textiles, by flexing the textile. These methods of removal are much simpler and takes less time than rubbing or peeling rubber cement adhesives from the substrate. The masking compositions of this invention can be completely removed without damage to the substrate. Of significant importance the masking composition of this invention can be used on textiles and then readily and completely removed.

The compositions used in this invention contain a hardenable binder. The binder adheres the mask to the substrate when in the hardened state. The bond of the hardened material to the substrate, however, should be relatively weak as noted above to allow the hardened mask to be easily removable from the substrate after use. The low bonding strength can be the result of the inherent relatively low physical properties of the binder or by the adhesive effectiveness of the binder being reduced. One method of reducing the effectiveness of the binder is to load the composition with a filler which is chemically inert in the composition and is of a particle size and present in an mount sufficient to maintain sufficient strength for air brush painting but also to reduce the strength and the bond of the hardened layer of the composition to the substrate so that it can readily be fractured and removed from the surface of the substrate.

Binders that are useful in this invention include low molecular weight organic polymers such as the phenolic resins that form weak brittle coating, adhesives such a polyvinyl acetate with reduced adhesion and certain hydratable inorganic compound. In this later class of binder materials, a particularly useful compound is calcium sulfate monohydrate, commonly known as plaster of Paris. Calcium sulfate monohydrate reacts with water and hardens to form calcium sulfate dihydrate. Plaster of Paris by itself is marginally suitable for use in this invention in that plaster of Paris by itself when mixed with the correct amount of water sets into a relative high strength material which bonds relatively securely to absorbent substrates like paper and textiles. It has been found, however, in accordance with this invention that materials such as plaster of Paris can be blended with a sufficient amount of a filler or pretreated to form a weakened hardened product with the desired relatively poor adhesion to substrates.

The weakening of the plaster of Paris, for example, can be effected by both of the above method. The preferred method to mix the plaster of Paris with a filler of a size and in an amount to substantially weaken the hardened layer. Different types of fillers can be used for this purpose. These materials include silica powder, sand, and calcium carbonate. Calcium carbonate is a particularly useful material for this purpose, in that, it is inexpensive and readily available in a range of suitable fineness. The plaster of Paris is mixed with calcium carbonate in amounts such that the hardened mixture is strong enough to be air brush painted but weak enough to be readily removed from the substrate after use. The desired hardened layer will be substantially weaker than a layer of pure hardened plaster of Paris.

An alternate method to weaken plaster of Paris is to partially pretreat the plaster of Paris with an amount water that will only partially convert the calcium sulfate monohydrate into calcium sulfate dihydrate and then drying the resulting product. When this partially hydrated product is later mixed with water and used as a masking composition the resulting hardened composition is substantially weakened by the presence of the previously hydrated material which acts similar to a filler.

The composition of this invention can be provided as dry mixture which is mixed as needed with a suitable fluid such as water immediately before use. This has certain disadvantages including the need to stop and mix a new batch of masking composition each time a mask is needed. It also results in a considerable waste of masking composition because of the excess mixed material being discarded.

It is preferable to prepare the masking composition ready for use in a stable liquid state. The liquid composition can then be stored until it is needed and then only what is required is used. This is an advantage in that the liquid composition can be prepared in volume and then packaged in smaller amounts for sale to artists wanting a ready to use product.

To obtain a stable liquid product generally requires that the composition contain an additive to stabilize the composition against premature reaction and hardening in storage. In addition the liquid composition should be stabilized against separation. Other additives such as anti-fungal additives, bactericides, coloring and so forth may be required or desirable depending on the particular components used in the masking composition.

A composition which has been found to be especially useful in this invention is comprised of about:

(Composition One)

3 parts by volume of plaster of Paris
4 parts by volume of fine ground calcium carbonate
2 parts by volume of water The compositions can be further improved by the addition of a stabilizer to inhibit hardening of the composition at ambient temperatures and will allow the composition to harden when heat is applied. There are various suitable materials for this purpose. It has been found that glycerin is well suited for this purpose in that it is effective in preventing premature hardening and is a common component of most paint composition so there are no substantial compatibility problems. The amount of glycerin required can be varied within a relatively wide range with about 6 parts by volume of glycerin based on the formulation of composition one being about optimum.

It is also of advantage to add a thickening agent to maintain the solids in the composition in suspension. The amount and type of thickening agent used is dependent on the desired consistency of the final product. It is also possible to use a thixotropic thickening agent to improve the application properties if the composition is intended to be painted or rolled onto the substrate. A particular useful thickening agent for use in the above composition is gelatin which is used in a small amount of about ¼ of a part by volume based on the above formulation.

A specific composition which has been found to be especially useful in this invention is comprised of about:

(Composition Two)

3 parts by volume of plaster of Paris
4 parts by volume of fine ground calcium carbonate
2 parts by volume of water
6 parts by volume of glycerin
¼ part by volume of powdered gelatin In the preparation of the composition of this invention the dry components are initially blended. The glycerin is then added and the combination pasted together. The water is then added and the resulting mixture blended and stirred until the mixture thickens into a stable composition. The final composition can be stored indefinitely until it is used.

In the FIG. 1–21 there are shown three different methods for using the masking compositions of this invention. In the figures cross hatching for color is used to help illustrate the method of this invention. The invention however is not limited to any particular color of combination of colors.

FIGS. 1–6 shown the progressive steps used in the masking and painting a substrate. In FIG. 1 there is shown a substrate 10, lined for red, having a diagonal area 12 indicated with the dotted line which is to be masked. In FIG. 2 a masking composition of this invention 14 is shown being applied with an air brash 16 to form a semi-solid layer of masking composition mask 18 on the surface of the substrate 10. The mask 18 could also be applied with an artist brush or a roller. In FIG. 3 a heat gun 20 is shown raising the temperature of the layer of applied mask composition 18 to cause the mask to harden. The layer of masking composition 18 could also be hardened by other means such placing the substrate in an oven. In FIG. 4 there is an illustration of paint, lined for blue, being air brushed on the substrate 10 over the mask 18. In FIG. 5 there is shown the removal of the mask 18 with an air blast 22. The air blast fractures the mask 18 in to particles 24 which are blown from the surface of the substrate 10. The mask 18 could also have been removed with a stiff brush to break the mask 18 and brush away the particles. In FIG. 6 there is an illustration of the completed substrate showing the masked area in the original color and the remainder of the substrate painted a different color.

In FIGS. 7–14 there is shown the series of steps used in the method of this invention when employing a stench to paint a positive reproduction of the stencil pattern on a substrate. The stench 30, as shown in the figures, is a simple stencil. In actual practice the stencil typically would be much more complex. The "stencil" could also be an open fabric such as a lace.

In FIG. 7 there is shown the starting substrate 26 with area desired to be masked 28 shown in dotted line. In FIG. 8 there is shown a stench being applied over the substrate 26. In FIG. 9 the masking composition is applied over the stench 30 to form the mask 32. In FIG. 10 the stench 32 is shown being removed to leave behind the mask 32 on the surface of the substrate 26. The applied layer of masking material 32 at this point has very little film strength and readily separates sharply at the edge of the stencil. FIGS. 11-14 shown similar steps as in FIGS. 3-6 previously described in which the mask 32 is heat hardened, the substrate painted, the mask 32 removed and finally the finished substrate with the desired pattern painted on the substrate. It should be noted that the painted pattern is a positive reproduction of the pattern in the stencil.

FIGS. 15-21 show the technique used in accordance with this invention when features are desired to be formed directly in the mask rather than cutting a stencil. In FIG. 15 there is shown the substrate 36 with the desired pattern of fine lines 38 shown in dotted line. In FIG. 16 the mask is formed over the entire surface of the substrate 36. In FIG. 17 the mask 40, before it is allowed to hardened, is shaped with a tool to form opening 42 in the mask 46 which correspond to the desired pattern of fine lines 38. The mask 40 is then hardened as shown in FIG. 18. In the same manner as in the other described techniques in FIG. 19 the substrate 36 is painted; in FIG. 20 the mask 40 is removed from the surface of the substrate to reveal in FIG. 21 the painted pattern of free lines 38 on the substrate.

Each of the above techniques was described separately. In actual practice all of the techniques can be used in combination to form the desired mask on a substrate. For example a stencil can be used to form the larger patterns and the deposited mask can be shaped before hardening to impart details into the mask which cannot easily be cut into a stencil.

The novel masking compositions and the method of this invention overcome the disadvantages of air brash painting. The preparation and application of a mask are much simpler and less time consuming with the present invention as compared to the prior art materials and methods. The masking compositions of this invention are applied in a liquid state and can even be air brushed on a substrate. Once applied the mask can be shaped to provide details in the final painting not previously obtainable with an air brash. Last, but not least, the mask, after use, can be readily removed without damaging the substrate on which it is applied. An addition advantage is that the masking composition and method of this invention can be used to make positive reproduction. A further important unique advantage of the compositions and method of this invention is that it can be applied in the liquid state to textiles, hardened into a mask and then removed after use without damaging the textile.

Various modifications and changes may become apparent to those skilled in the art once having been made aware of the disclosure of the present invention. These modifications and changes are included within the scope of the claims. The scope of this invention is not limited by the specific disclosure given by way of illustration but by the scope of the subjoined claims.

What is claimed is:

1. A method for masking a surface area of a substrate for air brush painting, said method comprising the steps of:
   (a) providing a masking composition, which can be applied in a liquid state to the surface of the substrate to be masked; after application forms a semi-solid layer with low film strength on the surface of the substrate, said layer have a solidarity that allow the layer to be shaped to form openings in the layer and a film strength to allow the layer to be separated to form defined openings in the layer; is hardened into an adherent, friable, paint masking effective, solid layer on the substrate of sufficent strength not to fracture when subjected to the air pressure used in air brush painting; and said solid layer being removable from the surface the substrate by fracturing the solid layer with air pressure higher than the air pressure used in the air brush painting:
   (b) applying the masking composition in the liquid state to the surface area of the substrate to be masked;
   (c) hardening the applied masking material composition to form a solid layer on the substrate;
   (d) painting the substrate having the hardened masking material composition on its surface; and
   (e) removing the solid layer from the surface of the substrate by fracturing the solid layer into particles and removing the resulting particles.

2. The method according to claim 1 wherein the semi-solid layer is shaped with tools to provide apertures through the semi-solid layer.

3. The method according to claim 1 wherein the masking composition is applied to the substrate by air brushing.

4. The method according to claim 1 wherein a stencil is applied to the surface of the substrate before the application of the masking composition, the masking composition is applied through the stencil onto the surface, and the stencil removed before hardening of the masking composition.

5. The method according to claim 1 wherein the masking composition is comprised is a hydratable binder and sufficient water to cause the hydratable binder to chemically react with the water and solidify.

6. The method according to claim 1 wherein the masking composition is comprised of a hydratable binder, a filler and water, the water being present in the composition in an amount sufficient to cause the binder to react with the water and form a solid and said flier being present in an amount sufficient to weaken the strength of the resulting solid layer as compared to compositions not containing the filler.

7. The method according to claim 6 wherein the masking composition further contains an inhibitor to prevent reaction of water with the binder at ambient temperature.

8. The method according to claim 7 wherein the composition further contains a stabilizer.

9. The method according to claim 6 wherein the hydratable binder is plaster of Paris.

10. The method according 6 wherein the filler is calcium carbonate.

11. The method according to claim 1 wherein the masking composition is comprised of plaster of Paris, calcium carbonate and water.

12. The method according to claim 1 wherein the masking composition is comprised of about 4 parts by volume of calcium carbonate, 3 parts by volume of plaster of Paris and 2 parts by volume of water.

13. The composition according to claim 1 wherein the masking method is comprised of about:

6 parts by volume of glycerin
   4 parts by volume of calcium carbonate
   3 parts by volume of plaster of Paris
   2 parts by volume of water
   ¼ part by volume of powder gelatin.

* * * * *